United States Patent
Min et al.

(10) Patent No.: US 8,756,942 B2
(45) Date of Patent: Jun. 24, 2014

(54) REFRIGERATOR AND METHOD FOR CONTROLLING THE SAME

(75) Inventors: Deulre Min, Changwon-si (KR); Eunyoung Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 13/192,758

(22) Filed: Jul. 28, 2011

(65) Prior Publication Data
US 2012/0023971 A1 Feb. 2, 2012

(30) Foreign Application Priority Data

Jul. 29, 2010 (KR) .......................... 10-2010-0073303
Jul. 29, 2010 (KR) .......................... 10-2010-0073304

(51) Int. Cl.
*F25D 25/00* (2006.01)

(52) U.S. Cl.
USPC .................................... 62/62; 62/125; 62/264

(58) Field of Classification Search
CPC ................................ F25D 23/02; F25D 31/00
USPC ............................. 62/62, 449, 125, 331, 264
See application file for complete search history.

(56) References Cited

U.S. PATENT DOCUMENTS

| 6,559,882 B1 * | 5/2003 | Kerchner ........................ 348/61 |
| 7,618,295 B2 * | 11/2009 | McCoy ......................... 439/676 |
| 7,686,127 B2 * | 3/2010 | LeClear et al. ............... 181/150 |
| 7,765,332 B2 * | 7/2010 | McCoy et al. .................... 710/2 |
| 7,853,142 B2 * | 12/2010 | Meyers et al. ................. 396/429 |
| 7,869,201 B2 * | 1/2011 | McCoy et al. ........... 361/679.07 |
| 7,931,114 B2 * | 4/2011 | LeClear et al. ............... 181/150 |
| 8,018,716 B2 * | 9/2011 | McCoy .................... 361/679.07 |
| 8,072,738 B2 * | 12/2011 | Kendall et al. ........... 361/679.01 |
| 8,085,543 B2 * | 12/2011 | McCoy ........................ 361/729 |
| 2006/0080190 A1 * | 4/2006 | Furukawa et al. .............. 705/28 |
| 2006/0096303 A1 * | 5/2006 | Kavounas ........................ 62/125 |
| 2007/0124020 A1 * | 5/2007 | Staples ........................ 700/229 |

* cited by examiner

*Primary Examiner* — Mohammad M Ali
(74) *Attorney, Agent, or Firm* — KED & Associates, LLP

(57) ABSTRACT

The present invention relates to refrigerators, and a method for controlling the same. The refrigerator includes a body, a door rotatably coupled to the body, a storage space in the body for storing goods therein, a camera unit mounted in the storage space for sensing an infrared ray from the stored goods to visualize a surface temperature distribution of the stored goods, a memory unit for storing the surface temperature distribution of the stored goods visualized thus by the camera unit therein, and a control unit for determining whether the stored goods are damaged or not with reference to a difference of the surface temperature distributions of the stored goods stored in the memory unit.

12 Claims, 9 Drawing Sheets

A quality of vegetable/fruit is changed.
Please abandon or consume the vegetable/fruit quickly.

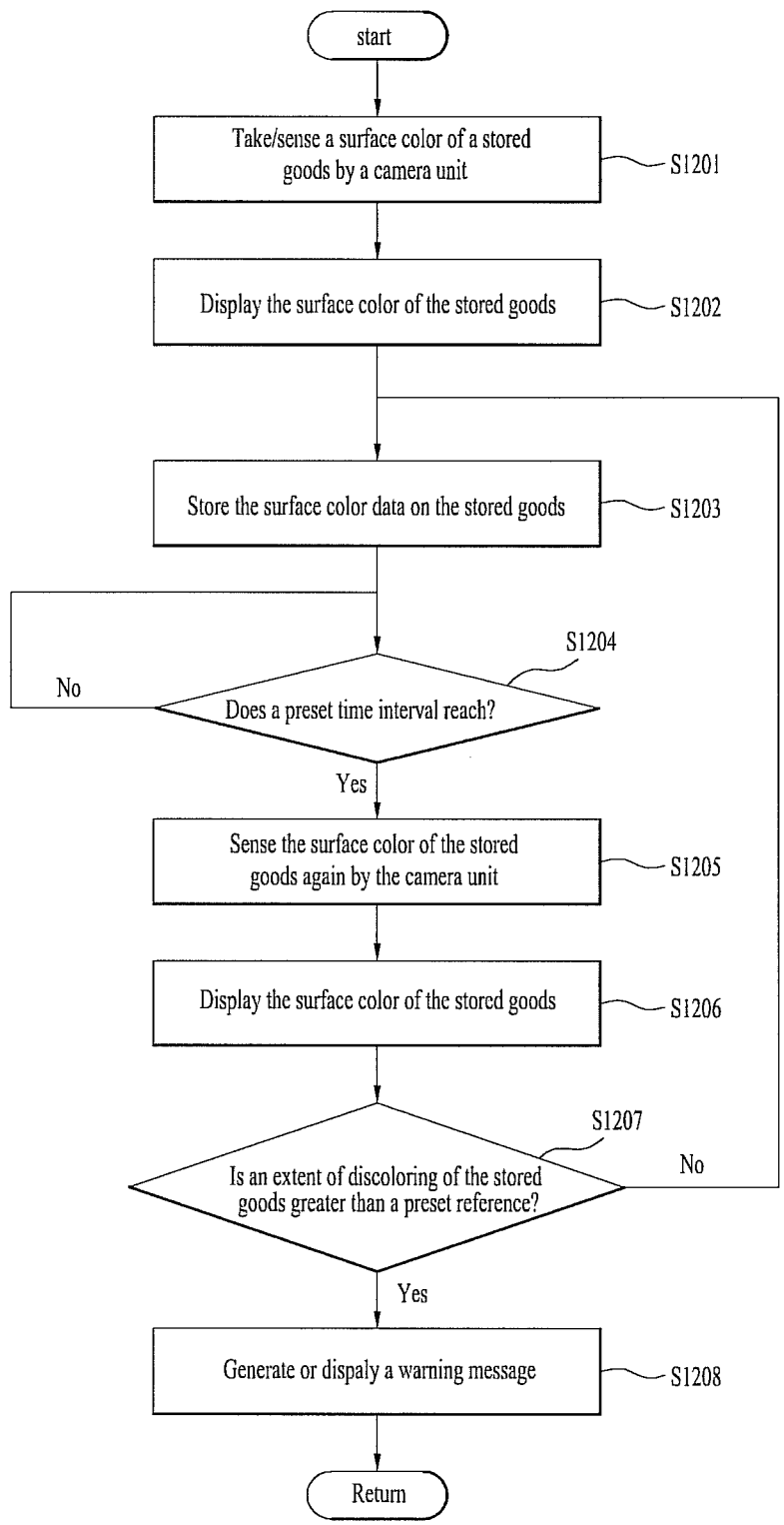

REFRIGERATOR AND METHOD FOR CONTROLLING THE SAME

CROSS REFERENCE TO RELATED APPLICATION

This application claims the benefit of the Patent Korean Application Nos. 10-2010-0073303, filed on Jul. 29, 2010 and 10-2010-0073304, filed on Jul. 29, 2010, which is hereby incorporated by reference as if fully set forth herein.

BACKGROUND OF THE DISCLOSURE

1. Field of the Disclosure

The present invention relates to refrigerators, and more particularly to a refrigerator which displays a quality change of goods stored therein to a user for improving convenience of the user and prevent the user from using the stored goods changed in quality; and a method for controlling the same.

2. Discussion of the Related Art

The refrigerator is an appliance for supplying cold air produced by a refrigerating cycle to a refrigerating chamber and a freezing chamber for maintaining freshness of various foods for a long time period.

In general, the refrigerator is provided with a body having a refrigerating chamber and a freezing chamber for storage of food, and a door rotatably coupled to the body at one side thereof for opening and closing the refrigerating chamber and the freezing chamber, and the body is provided with elements of the refrigerating cycle, such as a compressor, an evaporator, an expansion valve, and so on, for supplying the cold air produced by the evaporator to the refrigerating chamber and the freezing chamber for storage of the goods, such as food, stored in the refrigerating chamber and the freezing chamber for a long time period at a low temperature.

That is, in general, the freezing chamber is maintained at a temperature below $-18°$ C., and the refrigerating chamber has a refrigerated temperature in a range of about $2°$ C.

And, the refrigerating chamber is partitioned into a plurality of spaces with shelves and the like for making effective holding and storage of the stored goods according to kinds of the stored goods, wherein the refrigerating chamber has an upper region provided with a storage space for fish and the like, and a lower region provided with a storage space for storing vegetable and fruit.

The vegetable and fruit stored in the storage space are involved in tissue damage to change in quality by moisture in the storage space and microbes present on surfaces of the vegetable and the fruit when a certain time period is passed even if the vegetable and the fruit are stored at a low temperature.

However, in order to determine the quality of the vegetable and the fruit, since a quality analysis process is required, in which dryness and changes of nutrient components are measured, a long time period is required and a complicate procedure is involved.

Moreover, when the user intends to intake the vegetable and the fruit in the storage space, since the user will not use the quality analysis process under the reasons of required time period, expense, and the complicate procedure, there has been a risk of increased liability of being seized with a disease by intaking the vegetable and the fruit changed in quality thus.

In the meantime, recently as demands on high quality refrigerators increase gradually owing to living environment improvement, a display unit, such as an LCD panel, is provided to the refrigerator door for providing information on the refrigerator and controlling the refrigerator.

However, the display unit only provides the user with basic information, such as a time, and temperatures of the refrigerating chamber and the freezing chamber, but does not provide information on a quality change of the food stored in the refrigerating chamber, making the user to keep storing the quality changed food in the refrigerating chamber until a bad smell emits from the refrigerating chamber.

SUMMARY OF THE DISCLOSURE

Accordingly, the present invention is directed to a refrigerator and a method for controlling the same.

An object of the present invention is to provide a refrigerator in which a camera unit is mounted to an inside of a storage space which stores vegetable and fruit for sensing a surface temperature distribution of the vegetable and fruit, enabling to determine damage to the vegetable and the fruit by non-destructive means without taking a process of dryness measurement and changes of nutrient components of the stored goods and to display the damage to the vegetable and the fruit on a display unit for a user; and a method for controlling the same.

Another object of the present invention is to provide a refrigerator in which a camera unit is mounted to an inside of a storage space which stores meat, fish, vegetable and fruit for sensing an image of above stored things, enabling to determine damage to the stored things by non-destructive means without taking a process of dryness measurement and nutrient component change measurement of the stored things and to display the damage to the stored things on a display unit for a user; and a method for controlling the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present disclosure includes a refrigerator comprising: a body; a door rotatably coupled to the body; a storage space in the body for storing goods therein; a camera unit mounted in the storage space for sensing an infrared ray from the stored goods to visualize a surface temperature distribution of the stored goods; a memory unit for storing the surface temperature distribution of the stored goods visualized by the camera unit therein; and a control unit for determining whether the stored goods are damaged or not with reference to a difference of the surface temperature distributions of the stored goods stored in the memory unit The refrigerator further comprises a display unit provided to an outside of the door for making the surface temperature distribution of the stored goods visualized by the camera unit to be an image and displaying the image to a user.

Wherein the display unit displays whether the stored goods is damaged or not determined by the control unit to the user.

The refrigerator further comprises a heat source unit for supplying heat to the stored goods, and wherein the camera unit senses an infrared ray from the stored goods having the heat applied thereto from the heat source unit.

Wherein the camera unit senses the infrared ray radiated from the stored goods themselves.

Wherein the camera unit is mounted to an upper side of the storage space.

The refrigerator further comprises a button unit provided on one side of the display unit so that the button is configured to be manipulated by a user, wherein a manipulation of the button unit enables the camera unit to sense the infrared ray from the stored goods, or the display unit to display the surface temperature distribution or to display whether the stored goods is damaged or not, wherein the surface temperature distribution or whether the stored goods is damaged or not are displayed as an image on the display unit.

In another aspect of the present invention, A refrigerator comprises a body; a door rotatably coupled to the body; a storage space in the body for storing goods therein; a camera unit mounted in the storage space for sensing and visualizing an image of the stored goods; a memory unit for storing the image of the stored goods visualized thus by the camera unit therein; and a control unit for determining whether the stored goods are damaged or not with reference to a difference of the images of the stored goods stored in the memory unit.

The refrigerator further comprises a display unit provided to an outside of the door for displaying the image of the stored goods visualized by the camera unit.

Wherein the display unit displays whether the stored goods are damaged or not determined by the control unit to the user.

Wherein the camera unit senses a color of the stored goods.

Wherein the camera unit senses a shape of the stored goods.

Wherein the camera unit is mounted to an upper side of the storage space.

The refrigerator further comprises a button unit provided on one side of the display unit so that the button is configured to be manipulated by a user, wherein a manipulation of the button unit enables the camera unit to sense the infrared ray from the stored goods, or the display unit to display the surface temperature distribution or to display whether the stored goods is damaged or not.

In the present disclosure, A method for controlling a refrigerator having a camera unit mounted in a storage space for sensing an infrared ray from a stored goods to visualize a surface temperature distribution of the stored goods, comprises the steps of: sensing a surface temperature distribution of the stored goods by picture taking of the camera unit and storing a temperature distribution data sensed thus; sensing the surface temperature distribution of the stored goods by picture taking of the camera unit again after a predetermined time period is passed; comparing a prior surface temperature distribution of the stored goods to the present surface temperature distribution of the stored goods; and generating a warning message if a difference between the present temperature and the prior temperature is greater than a preset reference as a result of the comparison.

Wherein the temperature distribution data which is an object of the comparison is a temperature distribution data taken initially after placing the stored goods in the storage space.

In the present disclosure, a method for controlling a refrigerator having a camera unit mounted in a storage space for sensing an image of a stored goods to take a surface color of the stored goods, comprises the steps of: sensing the surface color of the stored goods by picture taking of the camera unit and storing a surface color data sensed thus; sensing the surface color of the stored goods by picture taking of the camera unit again after a preset time period is passed; comparing a prior surface color of the stored goods to the present surface color of the stored goods; and generating a warning message if an extent of discoloring is greater than a preset reference as a result of the comparison.

Wherein the surface color data which is an object of the comparison is a surface color data taken initially after placing the stored goods in the storage space.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 12 illustrates a flow chart of the control method for the second preferred embodiment of the present invention.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts. A size or a shape of an element shown in a drawing can be exaggerated for convenience or clarity of description. And, terms specially defined taking configurations or operation of the present invention into account can vary with intentions of users, operators, or usual practices. It is required that the definitions on the terms are made based on entire description of the specification.

And, an aspect of the present invention is not limited to the embodiments suggested herein, but persons skilled in this field of art who understand the aspect of the present invention can make other embodiments within the scope of the same aspect easily. However, it is natural that the other embodiments belong to a scope of the present invention.

Figure 1:
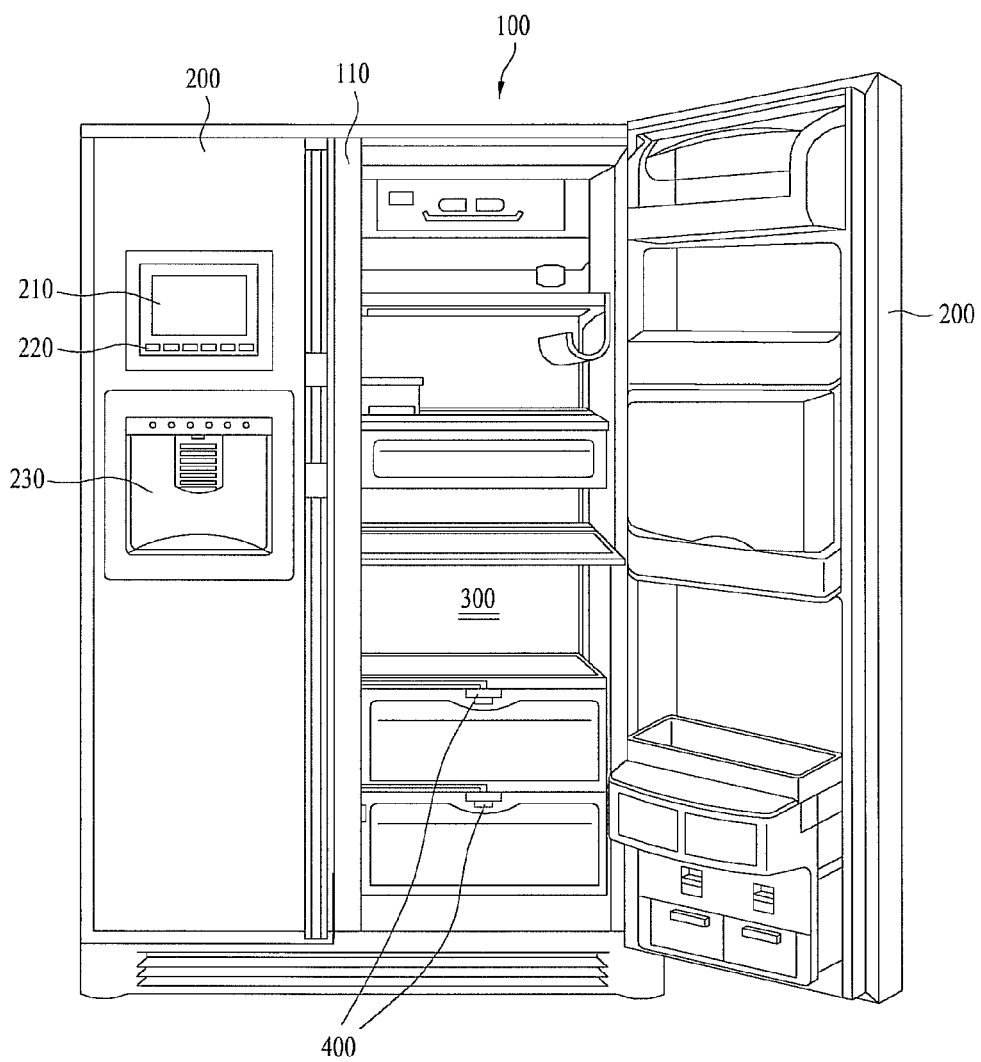
FIG. 1 illustrates a perspective view of a refrigerator in accordance with a first preferred embodiment of the present invention.

FIG. 1 illustrates a perspective view of a refrigerator in accordance with a first preferred embodiment of the present invention.

A basic structure of the refrigerator of the present invention will be described with reference to FIG. 1.

Referring to FIG. 1, a whole exterior of the refrigerator has a body 100 which is hexahedral, substantially.

The body 100 has a storage space 300 formed therein for storing food, and the storage space 300 is partitioned by a barrier 110 in the body 100 into a left side and a right side to provide a refrigerating chamber and a freezing chamber.

Of course, depending on kinds of the refrigerators, the barrier 110 can partition the storage space 300 into an upper side and a lower side, to provide a refrigerating chamber and a freezing chamber, and the present invention is applicable to different refrigerators regardless of the kinds of the refrigerators.

And, the storage space 300 is partitioned into a plurality of spaces by shelves and the like for making effective holding and storage of food according to kinds of stored goods, and a storage space 300 is provided on a lower side of the refrigerator for storage of vegetable and fruit.

It is preferable that the storage space 300 is provided as a space partitioned separately with a drawer or the like for storage of the vegetable and the fruit.

It is assumed that a storage space 300 in which a camera unit 400 to be described hereinafter is provided thereto is provided as a drawer, or a separately partitioned space.

The storage space 300 has the camera unit 400 mounted therein, for sensing an infrared ray from the vegetable and the fruit in the storage space 300 to visualize a surface temperature distribution of the vegetable and the fruit.

In the meantime, the body 100 has a front opening provided with a door 200 rotatably mounted thereto for selective opening and closing of the front opening of the body 100, i.e., the refrigerating chamber and the freezing chamber.

That is, the door 200 has a configuration in which the door 200 can open/close the refrigerating chamber and the freezing chamber respectively and independently by rotating the door 200 in opposite directions.

In the meantime, the door 200 which opens/closes the freezing chamber has a dispenser 230 provided thereto for easy dispensing of purified water or ice to the user.

And, mounted over the dispenser 230, there are a display unit 210 and a button unit 220, wherein the display unit 210 can be a liquid crystal display device LCD, for displaying a temperature, and humidity of the storage space 300, whether a refrigerating cycle is in operation or not, and a surface temperature distribution and damage to the vegetable and the fruit in the storage space 300 to the user.

And, by manipulating the button unit 220 on one side of the display unit 210, the user adjusts the temperature and humidity of the refrigerator, and makes the display unit 210 to display the surface temperature distribution and the damage to the vegetable and the fruit in the storage space 300.

Figure 2:
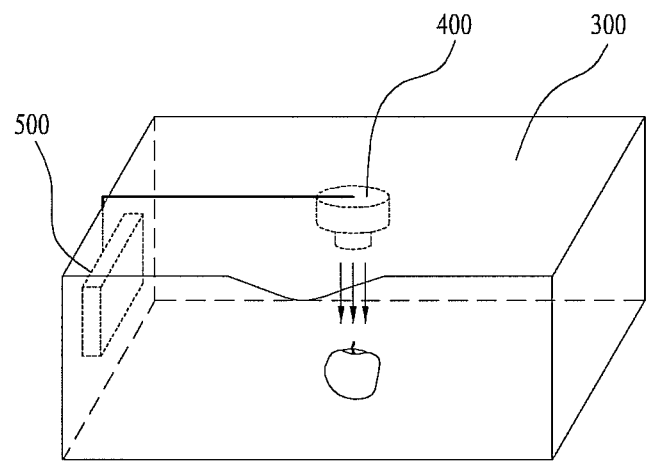
FIG. 2 illustrates a perspective view of a storage space in a refrigerator in accordance with a first preferred embodiment of the present invention.

FIG. 2 illustrates a perspective view of a storage space 300 in a refrigerator in accordance with a preferred embodiment of the present invention.

The camera unit 400 which senses an infrared ray from the vegetable and the fruit in the storage space 300 will be described with reference to FIG. 2, in detail.

Referring to FIG. 2, the camera unit 400 is mounted to an upper side of an inside of the storage space 300 provided on the lower side of the refrigerating chamber. The camera unit 400 is connected to a control unit 500 provided to one side of the storage space 300.

In the meantime, the camera unit 400 senses the infrared ray radiated from the vegetable and the fruit, for an example, an apple, in the storage space 300, and visualizes the surface temperature distribution by using the infrared ray from the apple.

That is, the present invention relates to a refrigerator for analyzing damage to the vegetable and the fruit in the storage space 300 by non-destructive means using a thermal image analysis which can visualize the infrared ray from vegetable or plant.

Accordingly, the camera unit 400 visualizes the surface temperature distribution of the vegetable and the fruit by using the infrared ray from the vegetable and the fruit in the storage space 300.

And, the control unit 500 determines whether the apple is damaged or not with reference to a difference of the surface temperature distributions visualized by the camera unit 400 thus.

That is, the surface temperature of the vegetable is determined by environmental factors and transpiration (An action in which water vaporizes through air holes in the vegetable to discharge surplus heat), wherein if tissue of the vegetable is damaged by different stresses, the air holes are closed, and the closed air hole can not make the transpiration.

The damaged tissue which can not transpire can not discharge heat, making the surface temperature of the vegetable high.

Accordingly, by controlling the camera unit 400 to visualize the surface temperature distribution of the vegetable and the fruit in the storage space 300 at every preset time, and comparing the surface temperature distributions of the vegetable and the fruit in the storage space 300 visualized thus, the control unit 500 determines that the vegetable and the fruit is damaged in a case a difference of the surface temperature distributions is greater than a preset temperature range.

Figure 3:
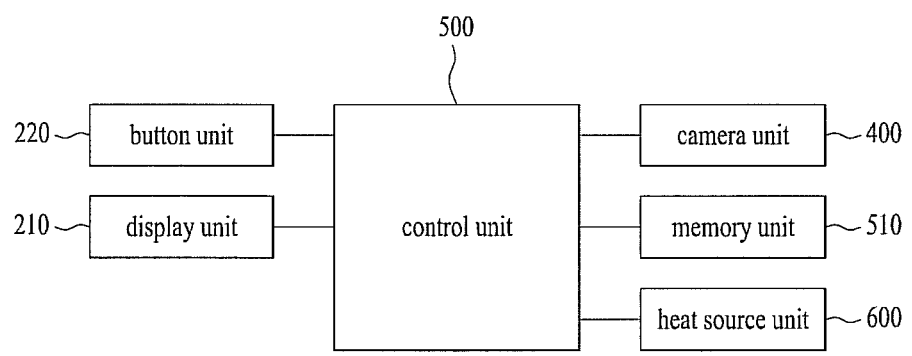
FIG. 3 illustrates a block diagram of key elements showing a control unit in a refrigerator in accordance with the first preferred embodiment of the present invention.

FIG. 3 illustrates a block diagram of key elements showing a control unit 500 in a refrigerator in accordance with a preferred embodiment of the present invention.

Operation of the refrigerator of the present invention for determining whether the vegetable and the fruit in the storage space 300 is damaged or not by using the camera unit 400 which senses the infrared ray will be described with reference to FIG. 3, in detail.

If the user intends to know whether the vegetable and the fruit in the storage space 300 is damaged or not, the user manipulates the button unit 220.

That is, when the user manipulates the button unit 220, the control unit 500 controls the camera unit 400 such that the camera unit 400 senses the infrared ray from the vegetable and the fruit in the storage space 300 at a time intervals and visualizes the surface temperature distributions of the stored goods.

In this instance, the time interval can be changed by manipulating the button unit 220.

And, the camera unit 400 can sense the infrared ray from the vegetable and the fruit by two methods of active thermography and passive thermography.

That is, the active thermography is a method in which a heat source is supplied to an object and an infrared ray returning from the object is sensed, and the passive thermography is a method in which an infrared ray the object itself emits by itself is sensed.

Therefore, if it is intended to visualize the surface temperature distribution of the vegetable and the fruit by the active thermography, a heat source unit 600 is provided in the storage space 300 for supplying heat to the vegetable and the fruit in the storage space 300 for the camera unit 400 to sense the infrared ray from the vegetable and the fruit having the heat supplied thereto from the heat source unit 600 to visualize the surface temperature distribution of the vegetable and the fruit.

And, if it is intended to visualize the surface temperature distribution of the vegetable and the fruit by the passive thermography, the camera unit 400 senses the infrared ray radiated from the vegetable and the fruit by itself to visualize the surface temperature distribution of the vegetable and the fruit.

In the meantime, the display unit 210 provided to the outside of the door 200 converts the surface temperature distribution of the vegetable and the fruit visualized by the camera unit 400 thus into an image, and displays the same to the user at fixed time intervals.

Therefore, with reference to the surface temperature distribution of the vegetable and the fruit in the storage space 300 displayed on the display unit 210, the user can perceive a quality state of the vegetable and the fruit in the storage space 300.

In the meantime, the control unit 500 stores the surface temperature distribution of the vegetable and the fruit visualized by the camera unit 400 thus at a memory unit 600, and determines whether the vegetable and the fruit are damaged or not according to a difference of the surface temperature distributions of the vegetable and the fruit stored in the memory unit 500 thus.

That is, if the difference of the surface temperature distributions of the vegetable and the fruit measured at fixed time intervals exceeds a preset temperature range, the control unit 500 determines that the tissue of the vegetable and the fruit is damaged.

Figure 4:
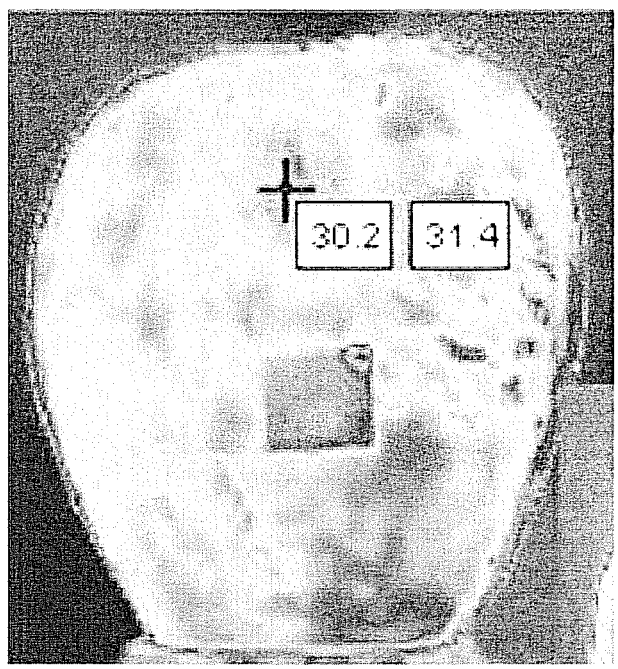
FIGS. 4 and 5 illustrate photographs of stored goods in a storage space in a refrigerator in accordance with the first preferred embodiment of the present invention, showing surface temperatures of the stored goods, respectively.

Referring to FIG. 4, right after the fruit, such as the apple, is stored in the storage space 300, the fruit shows a yellow color on the whole, and has a comparatively low temperature distribution.

However, as time passes by, since the tissue of the apple is damaged, to cause closure of the air holes impeding transpiration, the surface temperature of the apple rises.

Figure 5:
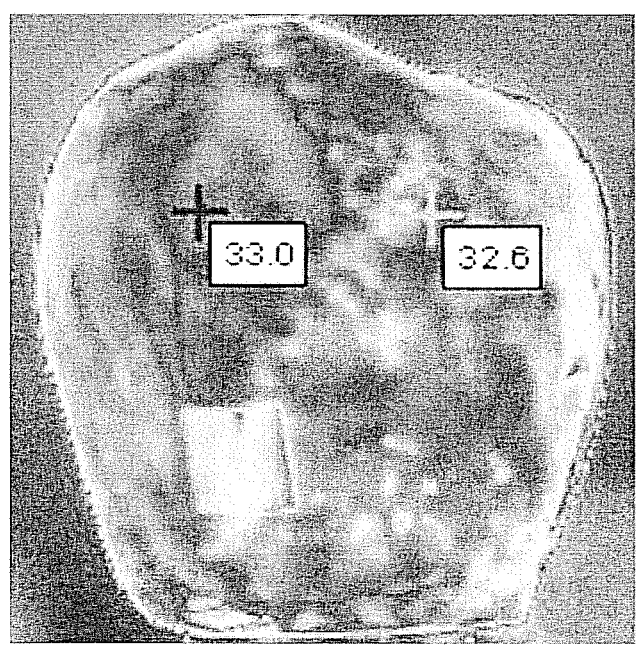
Figure 6:
FIG. 6 illustrates a diagram showing a message on a display unit on a front of a refrigerator in accordance with the first preferred embodiment of the present invention.

That is, referring to FIG. 5, if the tissue of the apple is damaged as time passes by, a red color is shown centered on the damaged tissue to have a comparatively high temperature distribution.

In this case, the control unit 500 compares the surface temperature distributions of the apple visualized thus before and after preset time periods are passed, and, if the difference of the surface temperature distributions exceeds the preset temperature range, the control unit 500 determines that the tissue of the vegetable and the fruit is damaged.

In this instance, the preset temperature range can be changed as the user desires by manipulating the button unit 220.

If the control unit 500 determines that the tissue of the vegetable and the fruit is damaged thus, the display unit 210 can display that a damaged fact of the vegetable and the fruit to the user, and, at the same time with, a message to abandon or consume the vegetable and the fruit.

According to this, if the tissue of the stored goods, such as the vegetable and the fruit, in the storage space 300 is damaged, since the user can abandon or consume the vegetable and the fruit right away, the user can prevent a bad smell from emitting from the storage space 300 by removing the vegetable and the fruit changed in quality.

Figure 7:
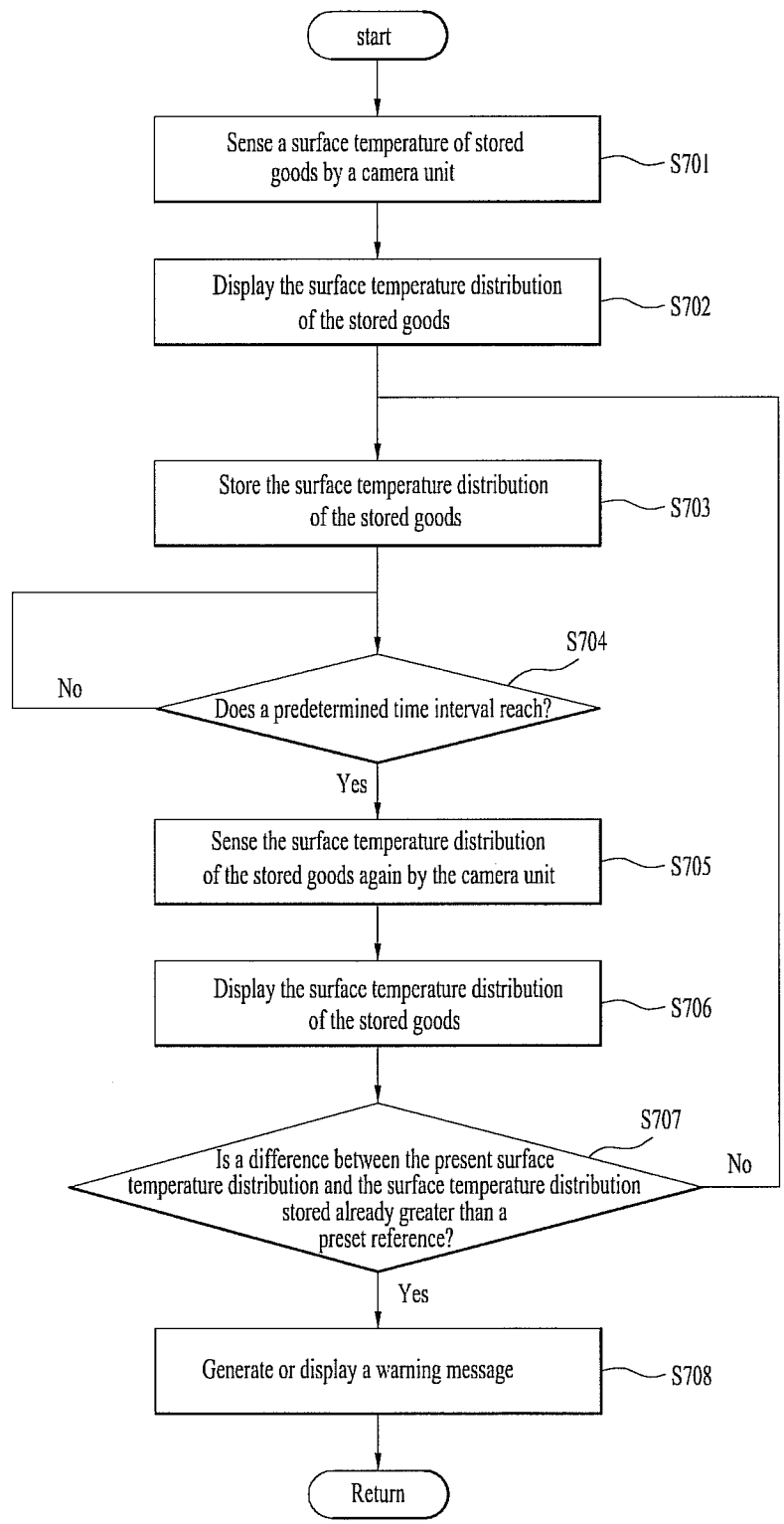
FIG. 7 illustrates a flow chart of the control method for the first preferred embodiment of the present invention.

FIG. 7 illustrates a flow chart showing the steps of a method for controlling a refrigerator in accordance with the first preferred embodiment of the present invention.

A camera unit senses an infrared ray from stored goods to sense a surface temperature of the stored goods, such as fruit (S701).

When the camera senses the surface temperature of the stored goods, the surface temperature of the stored goods is displayed on the display unit, and the user can see a thermal image of the temperature distribution (S702).

And, a surface temperature data on the stored goods are stored in a memory unit 510 (S703).

Then, whether a predetermined time period is passed or not is determined (S704), and, if yes, the camera unit senses the surface temperature of the stored goods, again (S705).

And, the display unit displays the surface temperature distribution of the stored goods (S706).

And, the surface temperature distribution of the stored goods sensed presently is compared to the surface temperature distribution of the stored goods stored already, and it is determined whether a difference of the surface temperature distributions exceeds a preset reference or not (S707).

If a temperature of a major portion of a surface of the stored goods is changed to 15° C. from 10° C. while the preset reference is 4° C., it is a state in which the temperature difference exceeds the preset reference.

The temperature distribution data which is to be used as a comparative reference is the surface temperature distribution of the stored goods taken initially after the user places the stored goods in the storage space 300.

That is, the 10° C. is the surface temperature distribution initially taken after storage, the 15° C. is the surface temperature distribution taken after a substantial time period is passed.

In a case the temperature change exceeds the preset reference, since the stored goods are liable to change in quality, the control unit 500 determines that the stored goods are damaged or has a high possibility of damage/change in quality.

And, a warning message is generated like an alarm or displayed by using the display unit or other audio unit (S708).

Thus, by tracing variation of temperatures of the stored goods and giving a notice to the user of the change in quality of the stored goods, the risk of increased liability of being seized with a disease by intaking the vegetable and the fruit changed in quality thus is reduced.

Figure 8:
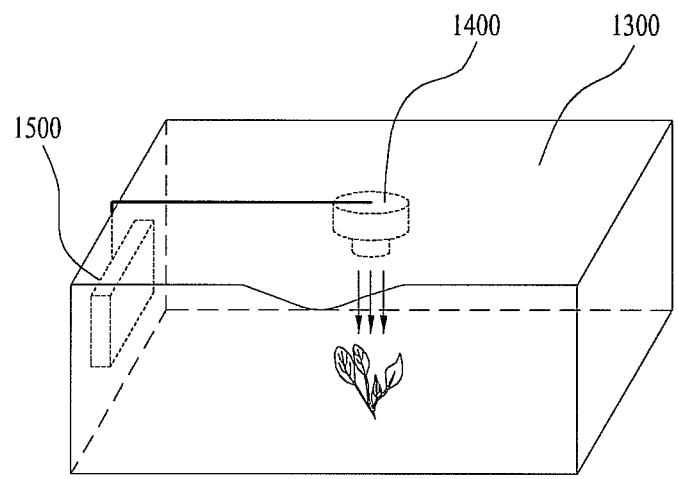
FIG. 8 illustrates a perspective view of a storage space in a refrigerator in accordance with a second preferred embodiment of the present invention.

FIG. 8 illustrates a perspective view of a storage space in a refrigerator in accordance with a second preferred embodiment of the present invention.

A camera unit 1400 for sensing an image of stored goods in a storage space 300 will be described in detail, with reference to FIG. 8.

It is preferable that the camera unit 1400 has features different from the camera unit 400 in the first embodiment. In detail, it is preferable that, though the camera unit 400 in the first embodiment is a temperature sensing camera, the camera unit 1400 in the second embodiment is a camera which can process color image information.

Referring to FIG. 8, the camera unit 1400 is mounted to an upper side of an inside of a storage space 300 on a lower side of the refrigerating chamber connected to a control unit 1500.

In the meantime, the camera unit 1400 senses and visualizes vegetable and fruit, for an example, spinach, in the storage space 300.

That is, the present invention is related to a refrigerator for making non-destructive damage analysis of meat, fish, vegetable and fruit in the storage space 300 by image processing.

In the image processing, an image from an image supply source is processed and displayed on a display panel of liquid crystal or plasma.

Therefore, the camera unit 1400 processes and visualizes the image of the meat, fish, vegetable and fruit in the storage space 300.

And, the control unit 1500 determines whether the spinach is damaged or not with reference to a difference of images of the spinach visualized by the camera unit 1400.

That is, if the vegetable and the fruit are stored in the storage space 300 for a long time period, the vegetable and the fruit is involved in reduction of a turgor pressure of cells thereof causing leakage of moisture to an outside of the vegetable and the fruit, and the cells having the moisture leaked therefrom shrink to make the vegetable and the fruit to wilt.

The vegetable and the fruit wilted thus is involved in a color change due to oxidation, to increase a ratio of a yellow color greater than a ratio of green color as time passes by.

Accordingly, the control unit 1500 controls the camera unit 1400 such that the camera unit 1400 visualizes a color of the vegetable and the fruit in the storage space 300 at every preset time.

And, the control unit 1500 compares the colors of the vegetable and the fruit in the storage space 300 visualized thus by the camera unit 1400, and determines that the vegetable and the fruit is damaged in a case a difference of the colors exceeds a preset color range.

In the meantime, though not shown, if the meat is stored in the storage space 300, the control unit 1500 determines whether the meat is damaged or not with reference to a difference of images of the meat visualized by the camera unit 1400.

That is, if the meat is stored in the storage space 300 for a long time period, meat juice leaks out of the meat.

If the meat juice leaks out of the meat thus, an entire exterior of the meat changes from an exterior of the meat to a boundary to which the meat juice reaches.

Accordingly, the control unit 1500 controls the camera unit 1400 such that the camera unit 1400 visualizes a shape of the meat in the storage space 300 at every preset time, compares shapes of the meat visualized thus by the camera unit 1400, and determines that the meat is damaged in a case the a difference of the shapes exceeds a preset shape range.

Figure 9:
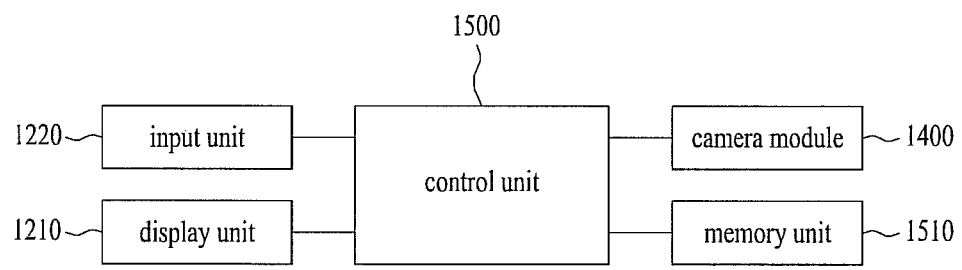
FIG. 9 illustrates a block diagram of key elements showing a control unit in a refrigerator in accordance with the second preferred embodiment of the present invention.

FIG. 9 illustrates a block diagram of key elements showing a control unit 1500 and other elements in a refrigerator in accordance with a second preferred embodiment of the present invention.

Operation of the refrigerator of the present invention for determining whether the meat, the fish, the vegetable and the fruit in the storage space 300 is damaged or not by using the camera unit 400 which senses the image of the image supply source will be described with reference to FIG. 9, in detail.

If the user intends to know whether the vegetable and fruit in the storage space 300 is damaged or not, the user manipulates the button unit 220.

That is, when the user manipulates the button unit 220, the control unit 1500 controls the camera unit 1400 such that the camera unit 1400 senses the color of the vegetable and the fruit in the storage space 300 at a time intervals and visualizes the color of the stored goods.

In this instance, the time interval can be changed by manipulating the button unit 220.

In the meantime, the display unit 210 provided to the outside of the door 200 displays the color of the vegetable and the fruit visualized by the camera unit 1400 to the user at fixed time intervals.

Therefore, with reference to the color of the vegetable and the fruit in the storage space 300 displayed on the display unit 210, the user can perceive a quality state of the vegetable and the fruit in the storage space 300.

In the meantime, the control unit 1500 stores the color of the vegetable and the fruit visualized by the camera unit 1400 thus at fixed time intervals at a memory unit 1510, and determines whether the vegetable and the fruit are damaged or not according to a difference of the colors of the vegetable and the fruit stored in the memory unit 1510 thus.

That is, if the vegetable and the fruit are discolored to have the difference of the colors of the vegetable and the fruit measured at fixed time intervals exceeds a preset color range, the control unit 1500 determines that the tissue of the vegetable and the fruit is damaged.

In the meantime, if the user intends to know whether the meat in the storage space 300 is damaged or not, the user manipulates the button unit 220.

That is, when the user manipulates the button unit 220, the control unit 1500 controls the camera unit 1400 such that the camera unit 1400 senses a shape of the meat in the storage space 300 at fixed time intervals and visualizes the shape of the stored goods.

In this instance, the fixed time interval can be changed by manipulating the button unit 220.

In the meantime, the display unit 210 provided to the outside of the door 200 displays the shape of the meat visualized by the camera unit 1400 to the user at fixed time intervals.

Therefore, with reference to the shape of the meat in the storage space 300 displayed on the display unit 210, the user can perceive a quality state of the meat in the storage space 300 by sensing an amount of meat juice leaked from the meat.

In the meantime, the control unit 1500 stores the shape of the meat visualized by the camera unit 1400 thus at fixed time intervals at the memory unit 1510, and determines whether the meat is damaged or not according to a difference of the shapes of the meat stored in the memory unit 1510 thus.

That is, if the shapes of the meat measured at fixed time intervals exceed a preset shape range following the leakage of the meat juice, the control unit 1500 determines that the tissue of the meat is damaged.

Figure 10:
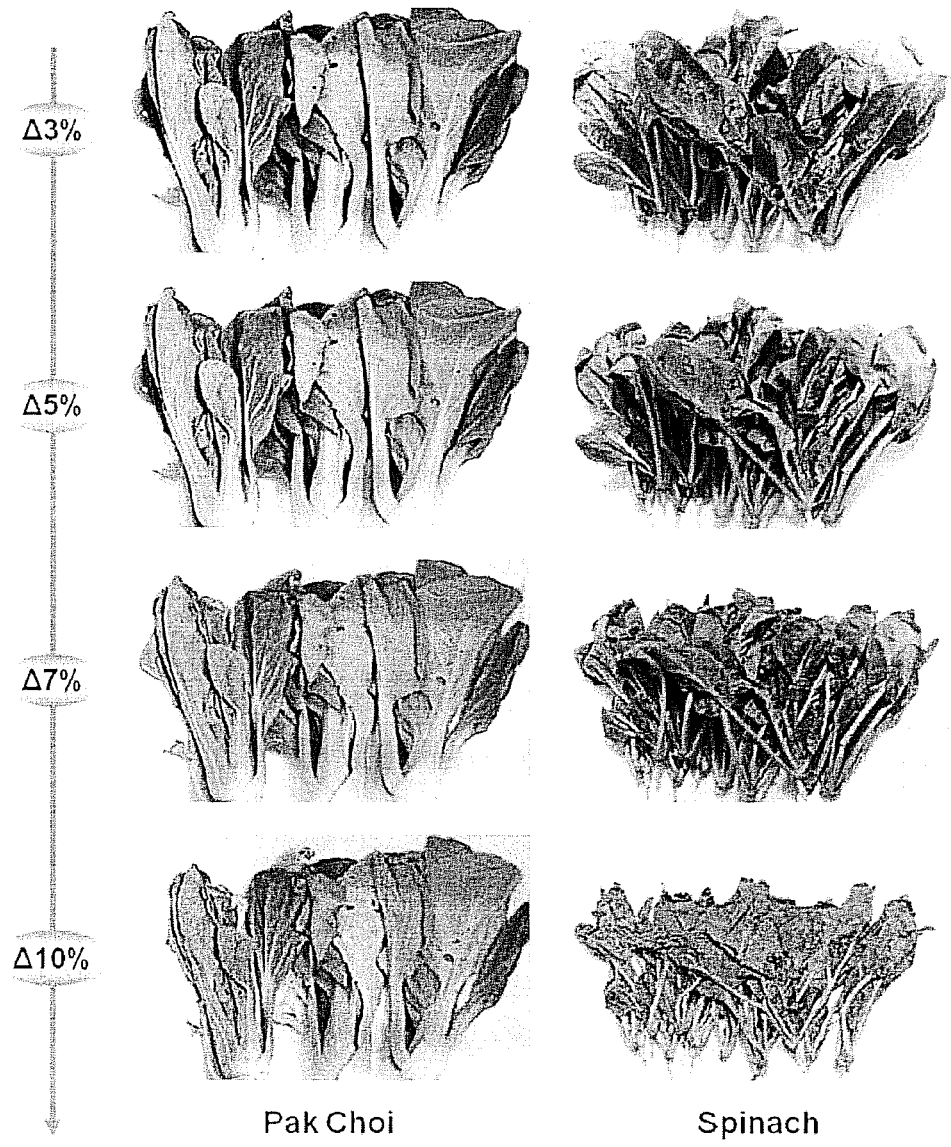
FIG. 10 illustrates photographs of stored goods in a storage space in a refrigerator in accordance with the second preferred embodiment of the present invention, showing surface state of the stored goods, respectively.

FIG. 10 illustrates color changes of the stored goods, for an example, spinach and pak choi, stored in the storage space of the refrigerator in accordance with a preferred embodiment of the present invention.

As shown on an upper side of FIG. 10, vegetable, such as the spinach and the pak choi, is fresh with green color on the whole right after storage of the spinach and the pak choi in the storage space 300.

However, as a certain time period passes, tissue of the spinach and the pak choi is damaged, and a surface thereof is involved in color change by oxidation.

That is, as shown on a lower side of FIG. 10, in a case the tissue of the vegetable, such as the spinach and the pak choi, is damaged as time passes by, a ratio of yellow color increases centered on the damaged tissue, making the green color thin.

In this case, the control unit 1500 compares surface colors of the spinach and the pak choi provided as images before and after pass of predetermined time periods, and determines that the tissue of the spinach and the pak choi is damaged if a difference of the colors exceeds a preset color range.

In this instance, the preset color range can be changed to a color range the user desires by adjusting a Δ value with the button unit 220.

In the meantime, as another embodiment, if meat, such as pork and beef, is stored in the storage space 300, a whole shape of the meat is the same with an exterior of the meat itself right after storage of the meat, substantially.

However, as a certain time period passes by, tissue of the meant is damaged, and meat juice leaks from the meat, making an entire shape of the meat changes to a boundary the meat juice reaches thereto.

In this case, the control unit 1500 compares shapes of the meat provided as images before and after pass of predetermined time periods, and determines that the tissue of the meat is damaged if a difference of the shapes exceeds a preset shape range.

In this instance, of course, the preset shape range can be changed to a shape range the user desires by manipulating the button unit 220.

Figure 11:
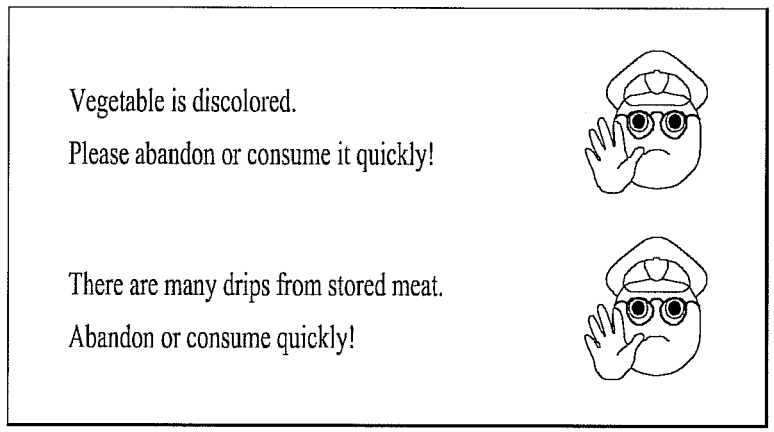
FIG. 11 illustrates a diagram showing a message on a display unit on a front of a refrigerator in accordance with the second preferred embodiment of the present invention.

If the control unit 1500 determines that the tissue of the meat, vegetable and the fruit is damaged, as shown in FIG. 11, the display unit 210 can display a fact that the meat juice is leaked, a fact that the color of the vegetable and the fruit is changed to the user, as well as a message for the user to abandon or consume the meat, the vegetable and the fruit.

According to this, if the tissue of the meat, vegetable and the fruit stored in the storage space 300 is damaged, since the user can abandon or consume the same right away, in a case the stored goods are changed in quality, the user can remove the stored goods changed in quality thus from the refrigerator quickly, thereby preventing bad smell from emitting.

FIG. 12 illustrates a flow chart showing the steps of a method for controlling a refrigerator in accordance with a second preferred embodiment of the present invention.

A camera unit takes a photograph of stored goods to sense a color of the stored goods, such as vegetable, fruit, and meat. (S1201).

When the camera takes the photograph of the stored goods, a state of the stored goods is displayed on the display unit.

In this instance, a picture the user can see is a photograph data showing a shape of the stored goods and a surface color of the stored goods (S1202).

And, a surface color data on the stored goods is stored in a memory unit 1510 (S1203).

Then, whether a predetermined time period is passed or not is determined (S1204), and, if yes, as the camera unit takes a photograph, the surface color of the stored goods is sensed, again (S1205).

And, the display unit displays the surface color of the stored goods (S1206).

And, the surface color of the stored goods sensed presently is compared to the surface color of the stored goods stored already, and it is determined whether an extent of discoloration exceeds a preset reference or not (S1207).

If the stored goods are green vegetable (for an example, spinach and the like), above can be a case when the surface color data on the stored goods stored already has a color distribution of about 90% of green, and the surface color data on the stored goods taken presently has the color distribution of below 70% of green.

And, it can be another example in which the surface color data on the stored goods stored already has a yellow color distribution of below 10% and the surface color data on the stored goods taken presently has a yellow color distribution of over 30%.

The surface color data which is to be used as a comparative reference is the surface color data on the stored goods taken initially after the user places the stored goods in the storage space.

That is, the case of the green color distribution of over 90% or below 10% in the green vegetable in above example is the surface color data initially taken after storage in the storage space, and the case of the green color distribution of below 70% or yellow color distribution of over 30% in the green vegetable is the surface color data taken after a substantial time period is passed.

In a case the extent of discoloration exceeds the reference, since the stored goods are liable to change in quality, the control unit determines that the stored goods are damaged or has a high possibility of damage/change in quality.

And, a warning message is generated like an alarm or displayed by using the display unit or other audio unit (S1208).

Thus, by tracing variation of temperatures of the stored goods and giving a notice to the user of the change in quality of the stored goods, the risk of increased liability of being seized with a disease by intaking the vegetable and the fruit changed in quality thus is reduced.

As has been described, the refrigerator and the method for controlling the same of the present invention have the following advantages.

The sensing of the infrared ray from the vegetable and fruit in the storage space by the camera provided in the storage space and visualizing the surface temperature distribution of the vegetable and the fruit permits easy determination whether the vegetable and the fruit is damaged or not by non-destructive means without taking a process of dryness measurement, nutrient component change measurement, and so on of the stored goods.

On the other hand, the sensing and visualizing of the image of the stored goods of the meat, the fish, the vegetable and the fruit in the storage space by the camera provided in the storage space permits easy determination whether the stored goods are damaged or not by non-destructive means without taking a process of dryness measurement, nutrient component change measurement, and so on of the stored goods.

Furthermore, the display whether the vegetable and the fruit is damaged or not on the display unit provided to the outside of the door permits quick removal of the vegetable and the fruit from the inside of the refrigerator if the vegetable and the fruit is changed in quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A refrigerator comprising:
   a body;
   a door rotatably coupled to the body;
   a storage space in the body in which goods are stored therein;
   a camera mounted in the storage space to sense an infrared ray from the stored goods to visualize a surface temperature distribution of the stored goods;
   a memory to store the surface temperature distribution of the stored goods visualized by the camera therein;
   a display disposed on an outside of the door to make the surface temperature distribution of the stored goods visualized by the camera to be an image and displaying the image to a user;
   a heat source that supplies heat to the stored goods; and
   a control to determine whether the stored goods are damaged or not with reference to a difference between the present surface temperature distributions and the prior surface temperature distributions of the stored goods stored in the memory, wherein the camera senses an infrared ray from the stored goods having the heat applied thereto from the heat source, and wherein the display informs the user whether the stored goods are damaged or not determined by the control.

2. The refrigerator as claimed in claim 1, wherein the camera is mounted to an upper side of the storage space.

3. The refrigerator as claimed in claim 1, further comprising a button provided on one side of the display so that the button is configured to be manipulated by a user, wherein a manipulation of the button enables the camera to sense the infrared ray from the stored goods, or the display to display the surface temperature distribution or to display whether the stored goods are damaged or not, wherein the surface temperature distribution or whether the stored goods are damaged or not are displayed as an image on the display.

4. A refrigerator comprising:
a body;
a door rotatably coupled to the body;
a storage space in the body in which goods are stored;
a camera mounted in the storage space to sense and visualize an image of the stored goods by an image processing;
a memory that stores the image of the stored goods visualized by the camera therein;
a display provided to an outside of the door to display the image of the stored goods visualized by the camera; and
a control to determine whether the stored goods are damaged or not with reference to a difference between the present image and prior images of the stored goods stored in the memory, wherein the display informs the user whether the stored goods are damaged or not determined by the control.

5. The refrigerator as claimed in claim 4, wherein the camera senses a color of the stored goods.

6. The refrigerator as claimed in claim 4, wherein the camera senses a shape of the stored goods.

7. The refrigerator as claimed in claim 4, wherein the camera is mounted to an upper side of the storage space.

8. The refrigerator as claimed in claim 4, further comprising a button provided on one side of the display so that the button is configured to be manipulated by a user, wherein a manipulation of the button enables the camera to sense the infrared ray from the stored goods, or the display to display the surface temperature distribution or to display whether the stored goods are damaged or not.

9. A method for controlling a refrigerator having a camera unit mounted in a storage space to sense an infrared ray from stored goods to visualize a surface temperature distribution of the stored goods, comprising:

sensing a surface temperature distribution of the stored goods by picture taking of the camera and storing a temperature distribution data sensed thereby;

sensing the surface temperature distribution of the stored goods by picture taking of the camera again after a predetermined time period is passed;

making the surface temperature distribution of the stored goods visualized by the camera to be an image and displaying the image to a user on a display provided to an outside of the door, comparing a prior surface temperature distribution of the stored goods to the present surface temperature distribution of the stored goods; and generating a warning message if a difference between the present temperature and the prior temperature is greater than a preset reference as a result of the comparison, wherein the camera senses an infrared ray from the stored goods having the heat applied thereto from a heat source that supplies heat to the stored goods.

10. The method as claimed in claim 9, wherein the temperature distribution data which is an object of the comparison is a temperature distribution data taken initially after placing the stored goods in the storage space.

11. A method for controlling a refrigerator having a camera unit mounted in a storage space to sense an image of a stored goods to take a surface color of the stored goods, comprising:

sensing the surface color of the stored goods by picture taking of the camera and by image processing, and storing a surface color data sensed thus;

sensing the surface color of the stored goods by picture taking of the camera and by image processing again after a preset time period is passed;

displaying the image of present surface color to a user on a display disposed on an outside of the door;

comparing a prior surface color of the stored goods to the present surface color of the stored goods; and generating a warning message if an extent of discoloring is greater than a preset reference as a result of the comparison.

12. The method as claimed in claim 11, wherein the surface color data which is an object of the comparison is a surface color data taken initially after placing the stored goods in the storage space.

* * * * *